Figure 1:
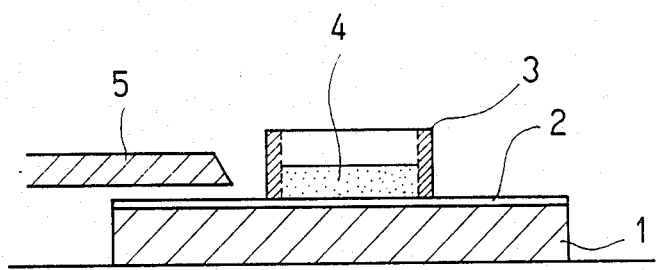

United States Patent [19]

Murase et al.

[11] Patent Number: 4,636,324

[45] Date of Patent: Jan. 13, 1987

[54] ANTI-ICING COMPOSITIONS

[75] Inventors: Heihachi Murase, Kanagawa; Kiyoshi Nanishi, Hiratsuka, both of Japan

[73] Assignee: Kansai Paint Company, Ltd., Japan

[21] Appl. No.: 712,724

[22] Filed: Mar. 18, 1985

[30] Foreign Application Priority Data

Mar. 30, 1984 [JP] Japan .................................. 59-63706
Apr. 23, 1984 [JP] Japan .................................. 59-82640

[51] Int. Cl.⁴ .......................... C09K 3/18; C09D 5/20
[52] U.S. Cl. ........................................ 252/70; 106/2; 106/13; 524/394; 524/395; 524/396; 524/405; 524/406; 524/407; 524/408; 524/413; 524/417; 524/423; 524/424; 524/442
[58] Field of Search ....................... 106/2, 13; 252/70; 524/394, 395, 396, 405, 413, 406, 407, 442, 417, 423, 408, 21

[56] References Cited

U.S. PATENT DOCUMENTS

| | | | |
|---|---|---|---|
| 3,770,633 | 11/1973 | Holley et al. | 106/13 X |
| 3,909,424 | 9/1975 | Clark | 252/12 |
| 4,011,189 | 3/1977 | Keil | 252/12 X |
| 4,110,095 | 8/1978 | Stengle, Jr. | 65/26 |
| 4,202,780 | 5/1980 | Brendle | 252/12 |
| 4,271,215 | 6/1981 | Coon | 427/387 |

FOREIGN PATENT DOCUMENTS

| | | | |
|---|---|---|---|
| 0772177 | 1/1972 | Belgium | 106/13 |
| 3238039 | 4/1983 | Fed. Rep. of Germany | 106/13 |

Primary Examiner—Thurman K. Page
Attorney, Agent, or Firm—Larson and Taylor

[57] ABSTRACT

The present invention provides: a composition for use in preventing the formation of ice comprising (A) organopolysiloxane, (B) alkali metal compound and (C) liquid or solid paraffin; a method for preventing the formation of ice by applying the composition to the surface of an object; and another method for preventing the formation of ice by applying a primer containing a silane coupling agent to the surface of an object and applying the composition to the primer coat formed.

6 Claims, 1 Drawing Figure

ANTI-ICING COMPOSITIONS

This invention relates to compositions for use in preventing the formation of ice and to methods for prevention of icing.

Heretofore attempts have been made to prevent the formation of ice by applying a coating composition to the surface of an object to form coatings having reduced susceptibility to icing. Known coating compositions as used for this purpose include those containing acrylic resin, rubber, fluorine-containing resin, silicone resin, etc. Among them, organopolysiloxane resin, namely a kind of silicone resin, has been frequently used. For example, U.S.S.R. Pat. No. 789,080 discloses a silicone-type coating composition for prevention of icing intended to be applied in two layers. Further U.S. Pat. No. 4,271,215 teaches a coating composition for release of ice containing a specific type of carboxy-functional silcone resin and a tetraalkoxy titanium compound as a catalyst. The coatings formed from these coating compositions have more or less reduced susceptibility to icing, but fail to completely preclude ice from forming with high adhesion due to hydrogen bonds.

We made basic studies of the mechanism of icing, investigating the phenomenon of icing from viewpoints of three factors, namely surface-scientific, physical and thermodynamical factors and proposed anti-icing compositions (U.S. Pat. No. 4,448,919) comprising an alkali metal compound capable of breaking hydrogen bonds and organopolysiloxane resin which compositions are more effective in preventing ice formation than conventional anti-icing compositions. However, the proposed anti-icing compositions have the problem that icing strength is high against shear force although substantially satisfactorily low against a vertically pulling force. With this drawback, the proposed compositions fail to completely prevent ice from forming with adhesion due to hydrogen bonds. It is now strongly desired in industries to develop anti-icing compositions giving coatings capable of reducing icing strength against shear force (hereinafter referred to as "icing shear strength").

The main object of this invention is to provide an improvement in anti-icing compositions containing organopolysiloxane resin and alkali metal compound and having anti-icing properties.

Other objects and features of this invention will become more apparent from the following description.

FIG. 1 is a side elevation view, partially in section, showing the device used for testing the coating composition for susceptibility to icing.

Starting from the proposed anti-icing compositions, we conducted extensive research to develop anti-icing compositions giving coatings capable of lowering icing shear strength and found that anti-icing compositions containing a specific amount of paraffin are able not only to lessen icing shear strength, but also to maintain the effect of preventing icing for a significantly prolonged period of time. We have accomplished the present invention based on this novel finding.

The present invention provides anti-icing compositions comprising:

(A) 40 to 99.6% by weight of organopoly-siloxane resin comprising recurring structural units of the formula $$R_n Si(OR')_m O_{\frac{4-n-m}{2}}$$

wherein R represents hydrogen atom or monovalent organic group attached to the silicon atom by a carbon-silicon bond, R' represents hydrogen atom, $C_1$–$C_{20}$ alkyl group, acyl group, aryl group, oxime residue, n and m are each 0, 1, 2 or 3 and n plus m is an integer of 1 to 3, (B) 0.2 to 30% by weight of alakli metal compound represented by the formula $$M_a \oplus X \ominus$$

wherein M represents alkali metal selected from Li, Na and K, X represents inorganic or organic acid group and a is an integer of 1 to 4, and (C) 0.2 to 30% by weight of liquid paraffin and/or solid paraffin.

The present invention further provides methods for preventing the formation of ice by applying the anti-icing composition comprising the organopolysiloxane (A), the alkali metal compound (B) and the liquid paraffin and or solid paraffin (C) to the surface of an object to be coated.

Our research revealed that when a primer (D) containing a silane coupling agent is applied to the surface of an object to be coated prior to application of the present composition, coatings formed from the present composition have a further improved cohesion between the surface of the object and the icing-preventive coating and can maintain the icing-preventing effect for a prolonged period of time. Thus the present invention further provides methods for preventing ice formation by applying the silane coupling agent (D) to the surface of an object to be coated and then covering the primer coat with the anti-icing composition comprising the organopolysiloxane resin (A), alakli metal compound (B) and liquid paraffin and/or solid paraffin (C).

The present composition is able to achieve complete prevention of icing by the composite actions of the three components, namely combined actions due to the interfacial and physical characteristics of the organopolysiloxane resin (A), thermodynamic property of the alkali metal compound (B) and surface orientation characteristic of the paraffin (C).

The organopolysiloxane resin has a chain of hydrocarbon atoms arranged on its surface and thus is low in surface energy. Further, this resin contains such small amount of a polar ingredient prone to form hydrogen bonds that the resin is able to form a water-repellent surface. The ability of the resin (A) to reduce susceptibility to icing is derived largely from the physical characteristics of the resin, particularly at low temperatures, in addition to the low surface energy thereof. The resin (A) is low in rigidity and has a low glass transition temperature. Thus even at extremely low temperatures, e.g. $-30°$ C., the mobility of the resin molecules is not intercepted so that this factor, coupled with its low rigidity, results in less likelihood of the resin molecules being caught by water molecules to form hydrogen bonds.

The action of alkali metal compound will be described below by referring to the use, by way of example, of lithium compound, a kind of alkali metal compound. The ion of Li$\oplus$ is small in radius (0.6 Å) so that the hydration energy is as great as 125 kg cal g/Ion (that of Na⊕ is 94.6 kg cal g/Ion). Five water molecules are adsorbed on the ion of Li⊕ and 10 water molecules are adsorbed on the surface of the 5 water molecules. These water molecules do not contribute to the formation of hydrogen bonds because the molecules are positioned too near the lithium ion and are adsorbed by greater energy than hydrogen bonds. The lithium compound trapped in the matrix of the organopolysiloxane resin do not permit the water molecules adsorbed on the surface of the coating to become congealed, consequently allowing no formation of ice. Similar actions are achieved in the case of the Na⊕ ion and K⊕ ion but less effectively than with Li⊕ ion which is thus more adequate for use.

The paraffin (C) of the present invention achieves surface orientation. More specifically, the paraffin (C) has chains of nonpolar hydrocarbon atoms arranged on its surface and thus is low in surface energy. Further, the paraffin (C) serves to lubricate the surface of coatings, thereby contributing to reduction of icing shear strength.

The organopolysiloxane (A) of this invention is represented by the structural unit

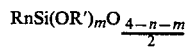

and can be dispersed and/or dissolved in water or an organic solvent, thereby taking a liquid form. R in this formula represents hydrogen atom or monovalent organic group attached to the silicon atom by a carbon-to-silicon bond. Examples of the organic groups are alkyl groups such as methyl, ethyl, propyl and hexyl; cycloalkyl groups such as cyclohexyl, cyclobutyl and cyclopentyl; aryl groups such as phenyl, tolyl, xylyl and naphthyl; aralkyl groups such as benzyl, phenylethyl, methylbenzyl and naphthylbenzyl; alkenyl groups such as vinyl, allyl and oleyl; alkenylaryl groups such as vinylphenyl; etc. Of these groups, lower alkyl groups having 1 to 6 carbon atoms are more effective in preventing ice formation. R' in the structural unit represents hydrogen atom and groups such as methyl, ethyl, propyl, butyl, amyl, hexyl, octyl and like alkyl groups having 1 to 20 carbon atoms; aryl groups; acetyl, propionyl, butyryl and like acyl groups having 1 to 8 carbon atoms; oxime residues represented by

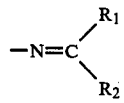

wherein $R_1$ and $R_2$ are the same or different and are each alkyl group having 1 to 6 carbon atoms.

The organopolysiloxane resin of the present invention is usable without limitation on the molecular weight insofar as it is dispersible and/or soluble in water and an organic solvent, as described above. Generally use is made of those having a number average molecular weight of about 300 to about 1,000,000, preferably about 1,000 to about 500,000. It is preferred to use the organopolysiloxane resin having reactive groups such as hydroxyl group or alkoxy groups. Such organopolysiloxane resins include those available under Z-6018, Z-6188, Sylkyd 50 and DC-3037 (products of Dow Corning Corp., U.S.); KR-216, KR-218 and KSP-1 (products of Shin-etsu Silicone Kabushiki Kaisha, Japan); TSR-160 and TSR 165 (products of Toshiba Corp., Japan); SE 1821, SE 1980, SE 9140, SRX 211, PRX 305, SH 237 and SH 9551 RTV (products of Toray Silicone Kabushiki Kaisha, Japan); etc.

The organopolysiloxane resin is used in an amount of 40 to 99.6% by weight, preferably 75 to 99.0% by weight, based on the present composition. The susceptibility of the coating to icing is markedly increased when the present composition contains the organopolysiloxane resin in an amount of more than 99.6% by weight or less than 40% by weight.

M in the formula MaX representing the alkali metal compound (B) is alkali metal selected from Li, Na and K among which Li is most suitable for use. X in the formula is inorganic or organic acid group or hydroxyl group. The inorganic acid group means a portion which remains after removing at least one hydrogen atom substitutable with metal from the molecule of an inorganic acid group. The remaining portion includes single atoms such as $F^\ominus$, $Cl^\ominus$, $Br^\ominus$ and $I^\ominus$ and atomic groups such as $NO_3^\ominus$, $CO_3^{2\ominus}$, $PO_4^{3\ominus}$, $HOP_4^{2\ominus}$, $SO_4^{2\ominus}$, $HSO_4^\ominus$, $MnO_4^\ominus$, $Cr_2O_7^{2\ominus}$, $SiO_4^{4\ominus}$, $SiO_3^{2\ominus}$, $BO_2^\ominus$, $VO_4^{3\ominus}$, $WO_4^{2\ominus}$, etc. The organic acid group means a portion which remains after removing at least one of hydrogen atoms substitutable with metal from the molecule of a saturated or unsaturated monocarboxylic acid or polycarboxylic acid groups of the formula $HCOO^\ominus$, or $CH_3(CH_2)_nCOO^\ominus$ wherein n is 0 or an integer of 1 to 20; saturated dicarboxylic acid group of the formula

wherein n is 0 or an integer of 1 to 10; maleic acid, oleic acid, linoleic acid and like unsaturated acid groups; and polycarboxylic acid groups such as tartaric acid group of the formula $^\ominus OOC-(CHOH)_2-COO^\ominus$, citric acid group of the formula

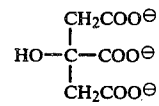

trimellitic acid group of the formula

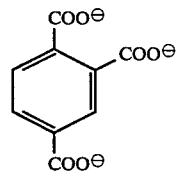

pyromellitic acid group of the formula

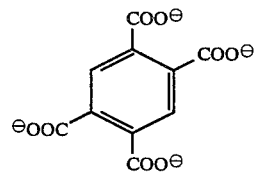

etc.

The value a of the formula varies with the kind of the organic or inorganic acid groups and is generally an integer of 1 to 4.

Examples of alkali metal compounds having the above formula are LiF, LiCl, LiBr, LiI, NaF, NaCl, NaBr, NaI, KF, KCl, KBr, KI, LiNO$_3$, NaNO$_3$, KNO$_3$, Li$_2$CO$_3$, Na$_2$CO$_3$, K$_2$NO$_3$, Li$_3$PO$_4$, Na$_3$PO$_4$, KPO$_4$, Li$_2$SO$_4$, Na$_2$SO$_4$, K$_2$SO$_4$; LiMnO$_4$, NaMnO$_4$, KMnO$_4$, Li$_2$Cr$_2$O$_7$, Na$_2$Cr$_2$O$_7$, K$_2$Cr$_2$O$_7$, Li$_4$SiO$_4$, Li$_2$SiO$_3$, Na$_4$SiO$_4$, Na$_2$SiO$_3$, K$_4$SiO$_4$, K$_2$SiO$_3$, LiBO$_2$, NaBO$_2$, KBO$_2$, Li$_3$VO$_4$, Na$_3$VO$_4$, K$_3$VO$_4$, Li$_2$WO$_4$, Na$_2$WO$_4$, K$_2$WO$_4$; HCOOLi, HCOONa, HCOOK, Li$_2$C$_2$O$_4$, Na$_2$C$_2$O$_4$, K$_2$C$_2$O$_4$, CH$_3$COOLi, CH$_3$COONa, CH$_3$COOK, C$_2$COOLi, LiOOC—CH$_2$—COOLi, lithium citrate, sodium citrate, potassium citrate, lithium tartarate, lithium salt of trimellitic acid, lithium salt of pyromellitic acid, etc.

Of these alkali metal compounds, chlorides are most effective in preventing ice formation. However, care should be taken in using salts of strong acids which are apt to produce rust on metallic substrates. Carbonates, silicates and acetates are next to chloride in effect of prevention of icing and are more suited because of the preventing action maintained for a prolonged period of time and less likelihood of producing rust. Of these alkali metal compounds, lithium compounds are superior in precluding icing to sodium compounds and potassium compounds, hence more adequate for use.

These alkali metal compounds are usable singly or at least two of them can be used in admixture. The alkali metal compound is used in an amount of 0.2 to 30% by weight, preferably 0.5 to 10% by weight, based on the present composition. With less than 0.2% by weight of the compound, reduced effect of preventing icing results, whereas if the amount of the compound used is more than 30% by weight, the physical properties and duration of the coatings are impaired.

Paraffins (C) used in the present invention include liquid and solid paraffins heretofore used in the art. Useful liquid paraffins are those with 10 to 24 carbon atoms having a number average molecular weight of about 150 to about 250, taking a liquid form at ordinary temperature and generally called white oils. Useful solid paraffins with about 18 to about 30 carbon atoms as the major component having a number average molecular weight of about 250 to about 350 and a melting point of 50° C. or lower, preferably 40° C. or lower, taking a solid form at ordinary temperature and soluble or dispersible in a usual organic solvent. Liquid paraffins, particularly those having a pour point of −5° C. or lower, are very effective in abating icing shear strength because they can retain its fluidity even at a temperature less than freezing point, hence adequate for use. Examples of paraffins are liquid paraffins available under "Carnation," "Kloarol," "Blandol," "Benol" and "Kaydol" (products of Witco Chemical, Co., U.S.), etc. and solid paraffins such as paraffin waxes Nos. 110, 115 and 120 (products of Nippon Seiro Co., Ltd., Japan).

The paraffin (C) is used in an amount of 0.2 to 30% by weight, preferably 0.5 to 15% by weight, based on the present composition. If less than 0.2% by weight of the paraffin is present, reduced icing shear strength results, whereas if more than 30% by weight of the paraffin is used, the physical properties and durability of the coatings are deteriorated.

In preparing the present composition, the organopolysiloxane resin, alkali metal compound and paraffin are mixed by the usual method employing a steel-ball mill, pebble mill, attritor mill, etc. A suitable organic solvent is added in adapting the present composition to coating purpose. Usable are solvents which are able to dissolve the organopolysiloxane resin as a base resin. A wide variety of solvents usually used in preparing coating compositions are used which include linear or cyclic hydrocarbons, ketone-type, ester-type solvents and alcohol-type solvents, etc. Water is employed as the solvent in preparing water-dispersible coating compositions.

The coating composition thus prepared is applicable directly over the surface of materials such as metal, plastics, glass, wood, etc. The present composition is moldable into strips of film which are laminated over the surface of an object, and may contain, when required, a coloring pigment, extender pigment, or a dye in an amount of up to 120 parts by weight per 100 parts by weight calculated as the combined amount of the components (A), (B) and (C). A surfactant and other additives may be incorporated in the present composition.

According to the present invention, the formation of ice is prevented by a layer formed by applying the present composition to the surface of an object or, when required, by the layer covered with an overcoat of silicon oil. However, since the cohesion between the surface of the object and the layer is generally so low that blisters and peeling tend to occur, the desired prevention of ice formation may not be achieved with the layer having such defects, although the icing preventing effect varies depending on the kind of material for the surface of object, surface roughness, surface shape, etc. Our research showed that when a solution containing the silane coupling agent (D) is applied as a primer to the surface of an object, followed by application of the present composition over the primer coat, the layer of the present composition is bonded to the surface thereof with a great strength, whereby the prevention of ice formation can be attained to a remarkable extent.

Silane coupling agents (D) useful as the primer include those conventionally used, such as those represented by the formula

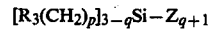
$$[R_3(CH_2)_p]_{3-q}Si-Z_{q+1}$$

wherein $R_3$ represents alkyl group having 1 to 8 carbon atoms, allyl group, aryl group, vinyl group, amino group, a group H$_2$NCH$_2$CH$_2$NH, meta-acryloxy group, acryloxy group, glycidoxy group, mercapto group, anilino group, octadecyldimethylammonium group or halogen atom; Z represents a group OR$_4$ or halogen atom; $R_4$ represents alkyl group, allyl group or aryl group optionally containing alkoxy group and having 1 to 8 carbon atoms; p is 0 or an integer of 1 to 6; and q is an integer of 1 or 2.

Examples of the silane coupling agent are methyltrimethoxysilane, methyltriethoxysilane, aminosilane, γ-(2-aminoethyl)aminopropyltrimethoxysilane, γ-(2-aminoethyl)aminopropylmethyldimethoxysilane, γ-methacryloxypropyltrimethoxysilane, γ-glycidoxypropyltrimethoxysilane, γ-mercaptopropyltrimethoxysilane, γ-mercaptopropylmethyldimethoxysilane, vinyltriacetoxysilane, γ-chloropropyltrimethoxysilane, γ-chloropropylmethyldimethoxysilane, vinyltris(methoxyethoxy) silane, γ-anilinopropyltrimethoxysilane, vinyltrimethoxysilane, methyltrichlorosilane, dimethyldichlorosilane, trimethylchlorosilane, etc.

Of these silane coupling agents, di- or tri-alkoxy (or alkoxyalkoxy)silane compound is preferred.

The solution of silane coupling agent used as the primer is prepared by dissolving the coupling agent in the solvent useful for coating compositions or in water. The coupling agent is present in the solution at a concentration of 0.05 to 30% by weight, preferably 0.1 to 10% by weight, based on the present composition. With a concentration of over 30% by weight, drying of the coatings takes a prolonged period of time and there results a low adhesion between the primer coat and the coating of the present composition, whereas a concentration of less than 0.05% by weight can not give coatings with improved adhesion to the surface of the object.

The silane coupling agent used as a primer in the present invention generally contains functional group such as amino, vinyl, epoxy, mercapto, methacryl, methacryloxy, etc. reacting with an organic material and other functional group such as methoxy, ethoxy, methoxyethoxy, chloro, etc. reacting with an inorganic material. Since these groups react with organic materials and inorganic materials, the coupling is able to bond organic materials to inorganic materials and therefore to increase the adhesion between an anti-icing layer and the surface of an object.

According to this invention, the primer is applied to the surface of an object by usual coating method such as brushing, spraying, immersing, etc. The amount of the primer is sufficient to form a dried layer about 0.1 to about 30 μm, preferably about 1 to about 10 μm, in thickness. The primer coat, dried generally in 2 to 48 hours at ordinary temperature, can be heated to increase the drying rate.

The present composition is applied directly to the surface of an object to be coated or, after application of the primer thereto, to the primer coat. The amount of the present composition is sufficient to give a dried layer about 10 to about 300 μm, preferably about 30 to about 100 μm, in thickness. The layer thus deposited is dried at ordinary temperature or with heating at about 50° to about 150° C.

When required, a silicone oil can be applied to the anti-icing layer thus formed. The application of silicone oil to the anti-icing layer produces a synergistic effect due to the combination of the ability of silicone oil to reduce its susceptiblity to icing with the anti-icing ability of the layer, and thus is pronouncedly effective in increasing the anti-icing action and in maintaining the action for a prolonged period of time. Usable as the silicone oils are those conventionally used such as those available under SH-510 and SH-200 (products of Toray Silicone Kabushiki Kaisha, Japan). The silicone oil is applied to the anti-icing layer by conventional methods in an amount of about 3 to about 50 g/m², preferably about 5 to about 20 g/m².

The present invention will be described in more detail with reference to the following examples in which parts and percentages are all by weight unless otherwise specified.

EXAMPLE 1

A 100 part quantity of addition polymerization-type organopolysiloxane resin (product of Toray Silicone Kabushiki Kaisha, Japan, available under SE-1821, 40% non-volatile ingredient), 2 parts of lithium acetate and 0.5 part of liquid paraffin (product of Witco Chemical Co., U.S., available under Kaydol, pour point −18° C.) were placed, together with alumina silicate beads 3 mm in diameter, in a Red Devil-type paint conditioner and were dispersed therein for 30 minutes. Ten parts of a platinum-type catalyst (product of Toray Silicone Kabushiki Kaisha, Japan, available under SE-1821 Cat) as a curing agnet was added to the dispersion to prepare a coating composition. The coating composition thus obtained was applied by an applicator to the surface of a stainless steel plate for icing tests which was then baked at 100° C. for 5 minutes. The coating formed thereby was 12 μm in thickness when dried. The coated plate was subjected to freezing at −10° C. for 2 hours and was tested by the method as described below for icing shear strength. Method of tests for icing shear strength Referring to FIG. 1, a stainless steel ring 3, 5 cm² in inner area, was placed on a layer 2 formed on a stainless steel plate 1 by applying the composition of this invention. Then the ring 3 on the layer 2 was introduced into a constant temperature bath at −10° C. and cooled for 90 minutes. A 2 ml quantity of water deionized by distillation and maintained at 5° C. was poured into the inside of the ring 3 to form ice 4 on the surface of the layer 2 which was then left to stand at −10° C. for 2 hours and then was tested by a load cell (not shown). Impact was imparted to the ring 3 by a power-driven operating rod (axle) 5 made of metal to measure the icing shear strength (kg/cm²) at which the ice 4 was separated from the layer, 2.

For comparative purposes, a further test (Comparison Example 1) for icing shear strength was conducted under the same conditions as above using a coating composition prepared in the same manner as above except that the liquid paraffin was not used. A table below shows the test results.

|  | Example 1 | Comp. Ex. 1 |
| --- | --- | --- |
| Icing shear strength (kg/cm²) | 0.15 | 0.6 |

EXAMPLE 2

A 100 part quantity of addition polymerization-type organopolysiloxane resin (product of Toray Silicone Kabushiki Kaisha, Japan, available under SRX-211, 40% non-volatile ingredient, approximately above 300,000 in number average molecular weight), 0.5 part of lithium chloride and 10 parts of liquid paraffin (product of Wito Chemical Co., U.S., available under Carnation, pour point −7° C. were dispersed in the same manner as in Example 1. Thereto was added 0.6 part of a platinum catalyst (product of Toray Silicone Kabushiki Kaisha, Japan, available under SRX-212 Cat) to prepare a coating composition. The coating composition thus prepared was applied in the same manner as in Example 1 to a stainless steel plate of the same kind and the coated plate was heated to 150° C. for 3 minutes to form a coating 20 μm in thickness when dried. The coating was tested by the foregoing method for ice shear strength after it was subjected to freezing at −10° C. for 2 hours.

For comparison, a test for icing shear strength were further carried out under the same conditions as in Example 1 by using a coating composition prepared in the same manner as in Example 2 except that the liquid paraffin was not used (Comparison Example 2 . The test results are shown below.

|                              | Example 2 | Comp. Ex. 2 |
|------------------------------|-----------|-------------|
| Icing shear strength (kg/cm²) | 0.1       | 0.8         |

EXAMPLE 3

A 100 part quantity of condensation polymerization-type organopolysiloxane resin (product of Toray Silicone Kabushiki Kaisha, Japan, available under SE-9140, 40% non-volatile ingredient), 4 parts of potassium carbonate and 20 parts of liquid paraffin of the same kind as used in Example 1 were dispersed in the same manner as in Example 1 and the coating composition thus prepared was applied in the same manner as in Example 1. The coated plate was dried at room temperature for 48 hours to form a coating 7 μm in thickness when dried. The icing shear strength was measured after the coating was subjected to freezing at −10° C. for 2 hours.

For comparison, a test for icing shear strength was further performed under the same conditions as in Example 3 by using a coating composition prepared in the same manner as in Example 3 with the exception of not using the liquid paraffin (Comparison Example 3). The test results are shown below.

|                     | Example 3 | Comp. Ex. 3 |
|---------------------|-----------|-------------|
| Icing shear strength | 0.05      | 0.7         |

EXAMPLE 4

A coating composition was prepared in the same manner as in Example 1 except that 5 parts of a 10% solution of solid paraffin in toluene (product of Nippon Seiro Co., Ltd., Japan, available under SP-110) and tested for icing shear strength. The test results are indicated below.

|                              | Example 4 |
|------------------------------|-----------|
| Icing shear strength (kg/cm²) | 0.2       |

EXAMPLE 5

A 5% solution of methyltriethoxysilane (product of Toray Silicone Kabushiki Kaisha, Japan, available under SZ 6072) in toluene was applied to an aluminum plate 2mm in thickness by brushing and the coated plate was dried at ordinary temperature for 2 hours. An anti-icing composition was prepared by mixing together 100 parts of condensation polymerization-type organopolysiloxane resin (product of Toray Silicone Kabushiki Kaisha, Japan, available under PRX-305), 5 parts of lithium carbonate and 8 parts of liquid paraffin (product of Witco Chemical Co., U.S., available under Carnation, pour point −7° C.) and dispersing them for 1.5 hours by usual method using a paint conditioner. The coating composition thus prepared was applied by an air-spray to the aluminum plate treated with the foregoing silane coupling agent to form a dried coating 70 μm in thickness.

The plate was secured as inclined at an angle of 45 degrees with its surface directed southward and subjected to outdoor exposure test for 6 months. Thereafter the appearance of coating was observed. For comparison, a further test was conducted in the same manner as above using the same kind of anti-icing composition with the exception of using an aluminum plate uncoated with the silane coupling agent (Comparison Example 4). The test results are shown below.

|                                                                                  | Example 5  | Comp. Ex. 4                      |
|----------------------------------------------------------------------------------|------------|----------------------------------|
| Weatherability (appearance of coating after to 6-month outdoor exposure test)   | No change  | Partially lifted and peeled      |

EXAMPLE 6

A composition was prepared which comprised γ-(2-aminoethyl)aminopropylmethyldimethoxysilane (product of Toray Silicone Kabushiki Kaisha, Japan, available under SZ-6023), condensation polymerization-type organopolysiloxane resin (product of Toray Silicone Kabushiki Kaisha, Japan, available under SH-237) and a solvent (toluene) in a ratio of 5:10:85. The composition was applied by brushing to a soft steel plate coated with an epoxy-type primer for prevention of corrosion. A 100 part quantity of addition polymerization-type organopolysiloxane resin (product of Toray Silicone Kabushiki Kaisha, Japan, available under SE-1821), 10 parts of potassium acetate and 5 parts of liquid paraffin (product of Witco Chemical Co., U.S., available under Kaydal, pour point −18° C.) were mixed together and dispersed in the same manner as in Example 5. Thereto was added 10 parts of a platinum catalyst (product of Toray Silicone Kabushiki Kaisha, Japan, available under SE-1821 Cat) as a curing catalyst. The coating composition thus obtained was applied to a soft steel plate pretreated as above.

The plate was tested for weatherability and water resistance by being secured in inclined state at an angle of 45 degrees with its surface directed southward. For comparison, a further test was effected in the same manner as in Example 6 using the same kind of anti-icing composition with the exception of employing the same kind of a plate uncoated with a silane coupling agent (Comparison Example 5). The test results are shown below.

|                                                                            | Example 6                                     | Comp. Ex. 5                      |
|----------------------------------------------------------------------------|-----------------------------------------------|----------------------------------|
| Weatherability (appearance of coating after 6-month outdoor exposure test) | No change                                     | Partially lifted and peeled      |
| Water resistance test (immersion in water for 24 hours)                    | Slightly whitened but recovered after drying | Partially whitened and peeled    |

EXAMPLES 7 and 8

A 10% solution of γ-metacryloxypropyltrimethoxysilane (product of Chisso Kabushiki Kaisha, Japan, available under MOPS-M) in toluene was applied by brusing to a 2mm-thick soft steel plate and the coated plate was dried at ordinary temperature for 5 hours. A coating composition was prepared in the same manner as in Example 5 by mixing together 100 parts of condensation polymerization-type organopolysiloxane resin (product of Toray Silicone Kabushiki Kaisha, Japan, available under SH-237), 3 parts of lithium chloride and 5 parts of liquid paraffin (product of Witco Chemical Co., U.S., available under Kaydol, pour point −18° C.) and dispersing them in the same manner as in Example 5. The coating composition thus obtained was applied by air spray to the plate treated with the silane coupling agent to form a dried coating 120 μm in thickness. After 16 hours, silicone oil (product of Toray Silicone Kabushiki Kaisha, Japan, available under SH-200, 50 cps) was applied by brushing to the coated plate to give a topcoat for prevention of ice formation.

The plate thus coated was held as inclined at an angle of 45 degrees with its surface directed southward and subjected to a 6-month outdoor exposure test for icing strength to observe the appearance of the coating in 6 months. Further tests were carried out in the same manner as in Example 7 using a plate of the same kind as above but without silicone oil coating (Example 8) and a plate of the same kind as above but untreated with silane coupling agent (Comparison Example 6) with the test results shown below.

|  | Example 7 | Example 8 | Comp. Ex. 6 |
|---|---|---|---|
| Weatherability (appearance of coating after 6-month outdoor exposure test) | No change | No change | Partially lifted and peeled |
| Icing shear strength (kg/cm²) | 0.2 | 0.8 | Unmeasurable |

EXAMPLES 9 and 10

A 15% solution of vinyl tris(methoxyethoxy) silane (product of Toray Silicone Kabushiki Kaisha, Japan, available under SH 6082) in isopanol was applied by brushing to a 10 mm-thick stainless steel plate and the coated plate was dried at ordinary temperature for 16 hours. A coating composition was prepared by mixing together 100 parts of condensation polymerization-type organopolysiloxane resin (product of Toray Silicone Kabushiki Kaisha, Japan, available under SH-237), 15 parts of potassium citrate and 10 parts of a 10% solution of solid paraffin in toluene (product of Nippon Seiro Co., Ltd., Japan, available under SP-110) and dispersing them in the same manner as in Example 4. The coating composition thus prepared was applied by an air spray gun to the plate treated with the silane coupling agent to form a dried coating 50 μm in thickness. Twenty-four hours later, silicone oil (product of Chisso Kabushiki Kaisha, Japan available under D 3770) was applied by brushing to the coated plate. The coated plate was checked for water resistance by observing the appearance of the coating and for icing strength. A futher test was conducted using a coating composition of the same kind as above in the same manner as above with the exception of using a plate of the same kind untreated with silicone oil (Example 10) with the test results as indicated below.

|  | Example 9 | Example 10 |
|---|---|---|
| Water resistance (by immersion in water for 240 hours) | Slightly whitened | Slightly whitened and expanded |
| Icing shear strength | 0.3 | 1.2 |

COMPARISON EXAMPLE 7

A long oil-type alkyd resin paint (product of Kansai Paint Co., Japan, available under SD Marine Paint) was applied to a 0.8 mm-thick soft steel coated with an epoxy-type primer for corrosion protection to form a dried coating 70 μm in thickness. The coated plate was tested for icing strength with the result that the icing shear strength was 3.4 kg/cm².

We claim:
1. A composition for use in preventing the formation of ice comprising:
   (A) 40 to 99.6% by weight of organopolysiloxane resin comprising recurring structural units of the formula

$$R_nSi(OR')_mO_{\frac{4-n-m}{2}}$$

wherein R represents hydrogen atom or monovalent organic group attached to the silicon atom by a carbon-silicon bond, R' represents hydrogen atom, $C_1$-$C_{20}$ alkyl group, acyl group, aryl group, oxime residue, n and m are each 0, 1, 2 or 3 and n plus m is an integer of 1 to 3,
   (B) 0.2 to 30% by weight of alkali metal compound represented by the formula
   $M_a^\oplus X^\ominus$ wherein M represents alkali metal selected from Li, Na and K, X represents inorganic or organic acid group and a is an integer of 1 to 4, and
   (C) 0.2 to 30% by weight of liquid paraffin and/or solid paraffin.
2. The composition according to claim 1 wherein R in the recurring structural units is alkyl group having 1 to 6 carbon atoms.
3. The composition according to claim 1 wherein the alkali metal compound is at least one of compounds selected from the group consisting of chlorides, carbonates, silicates and acetates.
4. The composition according to claim 1 wherein the alkali metal compound is lithium compound.
5. The composition according to claim 1 wherein the liquid paraffin has a pour point of −5° C. or lower.
6. The composition according to claim 1 which comprises 75 to 99.0% by weight of the organopolysiloxane, 0.5 to 10% by weight of the alkali metal compound and 0.5 to 15% by weight of the liquid paraffin and/or solid paraffin.

* * * * *